United States Patent [19]

Nilsson

[11] 4,110,519

[45] Aug. 29, 1978

[54] METHOD FOR THE PRODUCTION OF ELECTRODES FOR LEAD STORAGE BATTERIES

[75] Inventor: Ove Nilsson, Nol, Sweden

[73] Assignee: Aktiebolaget Tudor, Sundbyberg, Sweden

[21] Appl. No.: 833,688

[22] Filed: Sep. 15, 1977

Related U.S. Application Data

[63] Continuation-in-part of Ser. No. 751,885, Dec. 17, 1976, abandoned.

[30] Foreign Application Priority Data

Dec. 29, 1975 [SE] Sweden ............................... 7514663

[51] Int. Cl.² ............................................. H01M 4/56
[52] U.S. Cl. .................................... 429/217; 429/228; 29/623.5
[58] Field of Search .................... 429/217, 228, 225; 29/623.5; 264/104, 127; 141/1.1, 32

[56] References Cited

U.S. PATENT DOCUMENTS

| 2,686,213 | 8/1954 | Smyth | 429/228 |
| 3,060,254 | 10/1962 | Urry | 429/217 |
| 3,679,614 | 7/1922 | Shah et al. | 264/127 X |

*Primary Examiner*—Anthony Skapars
*Attorney, Agent, or Firm*—Burns, Doane, Swecker & Mathis

[57] ABSTRACT

An improvement in the production of plate type electrodes for use in lead storage batteries from a dry lead powder mixture is disclosed. The lead powder is mixed with a small amount (0.1 to 3 weight percent) of polytetrafluoroethylene (PTFE) powder, the mixture is heated and treated to convert substantially all of the PTFE into fibrous form. The mixture is applied to an electrode grid under conditions whereby a coherent, unitary structure is formed. A hot liquid (e.g., water) may be added to the mixture to form a paste.

8 Claims, No Drawings

METHOD FOR THE PRODUCTION OF ELECTRODES FOR LEAD STORAGE BATTERIES

CROSS-REFERENCE TO RELATED APPLICATION

This application is a continuation-in-part of U.S. Pat. application Ser. No. 751,885, filed Dec. 17, 1976, now abandoned.

BACKGROUND OF THE PRESENT INVENTION

The present invention concerns a method for the production of electrodes for lead storage batteries and the resulting electrodes. More specifically, the invention concerns electrodes and a method for forming electrodes where the active material in the form of lead powder is made to form a connected or continuous structure before or while it is applied to a supporting grid.

The starting material for the production of active material to form lead electrodes is called "lead powder", which term is somewhat inaccurate as the lead powder consists of lead powder of varying degrees of oxidation, and generally between 70 and up to 100%. By degrees of oxidation is meant the percentage of the total weight of the mixture which consists of lead oxides. As used herein, "lead powder" is intended to mean this highly oxidized lead powder mixture as known in the art. The lead powder is applied to a grid which usually consists of a diamond pattern or a number of connected ribs made of lead or lead alloys. There occur great variations, however, in the grid constructions, both with regard to their formation and the choice of material. A grid may, for example, consist of a number of suitably formed lead wires, or it may contain parts made of plastic or some other metal besides lead. Lead grids are usually produced by means of casting, but they can also be formed from expanded metal or stamped sheeting.

With certain electrode types such as the so-called tube electrodes and similar electrode types where the active material is surrounded by an outer sheath, the active material is applied on the grid in the form of dry powder. With such electrodes as well as with other electrode types the active material may also be applied as a so-called lubricating mass. This is accomplished, as is known in the art, by mixing lead powder with water and some sulfuric acid, and perhaps smaller amounts of other additions. In this way, a lubricant paste is obtained. In this paste, the lead powder forms a coherent structure. Its porosity depends on the addition used, and in order to obtain a high porosity, which is desirable in certain cases, special pore-makers may be added.

A special problem in connection with lead storage battery electrodes is caused by the volume variations that occur with both the positive and the negative electrodes. This is due to the fact that the active material in the case of the positive electrode in charged condition is composed of lead dioxide, and in the case of the negative electrode, of pure lead, while in the discharged condition the material in both electrodes is present in the form of lead sulphate. These different compounds have different volumes per unit of mass which causes a tendency to increase the volume of active material in electrodes with a subsequent separation of the active material, which forms a precipitate and sinks down to the bottom of the storage battery cell. This separation of active material in turn leads to a reduced capacity of the electrodes and shortens their life span. In order to avoid this problem, the electrodes, while being built into their respective cells, have been provided with supports of different kinds, e.g., with separators provided with glass fiber mats or sheets that are in contact with the electrodes. Such devices, however, can be relatively expensive, and even though these have led to the desired result, at least to a certain extent, additional improvements in this respect remain desirable.

OBJECTS AND SUMMARY OF THE INVENTION

It is an object of this invention to reduce or alleviate the problems of the prior art.

It is also an object of this invention to provide a method for producing plate-type electrodes utilizing a lead powder mixture and the resulting electrode.

In one aspect, the present invention provides a method for the production of a plate-type electrode for a lead storage battery comprising forming a mixture of lead powder which normally is at least 70% oxidized and from 0.1 to 3 weight percent polytetrafluoroethylene, heating the mixture, applying shear stresses to said powder mixture sufficient to convert substantially all of the polytetrafluoroethylene into fibrous form and applying the heated mixture to an electrode grid under conditions whereby a unitary, coherent structure is formed.

In another aspect, the present invention provides the electrode produced by this process.

According to the present invention, the lead powder is mixed with a smaller amount of polytetrafluoroethylene (PTFE) and is then processed in a particular manner. In this way a material is obtained which with further treatment during the transference on electrode grids forms a coherent, unitary structure. Despite the changes and transformations which the electrode material undergoes in connection with charging and discharging, the stability of this structure is maintained over a longer period of time, and the electrodes according to the invention in no way have poorer qualities than conventional electrodes.

DESCRIPTION OF THE PREFERRED EMBODIMENTS

The lead powder utilized in the powder mixture of this invention can be any of the conventional lead powders normally used in the dry powder production of tube electrodes for lead storage batteries having varying degrees of oxidation, generally from about 70 to about 100%.

Polytetrafluoroethylene powder (PTFE) is mixed with the lead powder in an amount of from about 0.1 to 3, preferably from about 0.2 to 0.5, percent by weight.

The mixture is then carefully heated to an elevated temperature and the heated mixture is then treated by applying shear stresses thereto so that a substantial portion of the PTFE is converted into fibers in the mixture. The mixture is generally heated to a temperature of about 80° C. The shear stresses may be applied by any suitable means such as, for example, by disposing the heated powder mixture between the walls of a rotating drum and a rotating cylinder for a time sufficient to form the PTFE into fibrous form by application of shear stresses. The powder changes its character and acquires somewhat reduced flow qualities.

Then the powder mixture is applied to an electrode grid, and in connection with this application, the mixture is further exposed to stresses whereby a continuous or coherent, unitary structure is formed.

The method according to the present invention has proven especially suitable with the production of electrodes of the so-called Faure type, as the treatment leading to the formation of a coherent, unitary structure takes place at the same time as the active material is applied to the electrode grid.

There are also other possibilities for the production of electrodes according to the invention; for example, plates or staves of the powder mixture can be pressed under conditions whereby substantially all of the PTFE is formed into fibers and converted into a coherent structure and then be applied to the electrode grid.

Pore-formers as $Na_2SO_4$ or $Al_2(SO_4)_3$, known in the art, can also be mixed into the powder mixture in minor amounts as conventionally utilized.

The invention is additionally illustrated in connection with the following Examples which are to be considered as illustrative of the present invention. It should be understood, however, that the invention is not limited to the specific details of the Examples.

EXAMPLE 1

Dry lead powder is mixed with 0.2 percent in weight of dry PTFE powder in a rotating drum mixer which consists of a rotating drum with a similar rotating cylinder in contact with the inside of the cylindrical wall. The drum's rotation speed is about 50 rpm and the mixing time is 5 minutes. The mixture is then heated to about 80° C and treated again in the mixer for about 10 minutes, during which time the rotation speed is about 40 rpm. Because of this treatment, fibers of PTFE are formed in the mixture and the qualities of the mixture are changed so that the dust binding inclination is greatly reduced and the flow qualities are somewhat impaired. This mixture is rubbed into an electrode grid consisting of a diamond pattern made of a cast lead alloy using conventional equipment. In the application of the mixture to the grid, further stresses are applied to the powder material as it is pressed into the grid. In the process, a coherent, unitary structure is formed from the active material.

EXAMPLE 2

1.5 kg lead oxide (71 weight percent PbO, 29 weight percent Pb) with a mean particle size of about 15 μm, 7.5 grams of Teflon ® PTFE powder "KlON" and 45 grams of $MgSO_4$ were premixed during 10 minutes and heated to 110° C over night. A sigma blade mixer was heated by IR-lamps to 100° C. The premixed and hot powder was charged into the mixer of Example 1 and the mixing started immediately. In less than 2 minutes a substantial amount of the PTFE powders were formed into fibers and the mixing was stopped.

The above-formed mixture was heated to 130° C and about 200 grams were now placed on a heated plate which had a surface temperature of about 80° C. A regular staggered grid of lead-antimony alloy, with the dimension of 148 × 148 × 4.2 millimeters heated to 130° C in an oven, was placed above the teflon-lead powder-$MgSO_4$-mixture and pressed firmly against it. Another 200 grams of the mixture formed as described above were now placed on the upper side by a roller about 2 centimeters in diameter, which was rolled over the paste under a firm pressure. Both sides of the sandwich were treated in this way and a plate with a well adherent paste was obtained. The plate was dropped (vertically) on the table from 1 centimeter several times and no loss of material was noted.

The invention described above comprises a mixture of PTFE powder and lead oxide, which by applying stresses to the mixture is worked to a dough including fibers of PTFE formed from substantially all of the PTFE powders originally present, which is well suited to paste into grids intended for use in lead acid storage batteries. The mechanical effort necessary to apply to this powder mixture in order to form PTFE fibers is not extensively large in the beginning of the mixing period, but increases as the fibers increase in length. In some cases, the mixture forms into a dough in a rather short period, which dough is very difficult to treat further in the mixer.

This problem may be avoided by the addition of a suitable liquid, preferably hot water or another hot liquid electrolyte containing anions able to form insoluble or slight soluble lead compounds acting as pore fillers. The liquid may be added in an amount sufficient to form a paste, which amount may be readily determined by one skilled in the art.

By adding water or a suitable electrolyte, the internal friction will decrease and the mixing can continue, which, for example, is necessary for most mixers in order to empty the mixer. The shear stresses on the mixture are reduced but not eliminated and further the substantial amount of fibers are already formed. The water or suitable electrolyte, should preferably be hot (above 60° C), thus allowing the fiber formation to continue or at least to prevent the already formed fibers to break with further mixing.

Suitable electrolytes include water solutions of $Na_2SO_4$ or $MgSO_4$ or diluted sulfuric acid, but are not restricted to only these electrolytes.

EXAMPLE 3

1.5 kg of lead oxide (71 weight percent PbO, 29 weight percent Pb) with a mean particle size of about 15μm was premixed in a rotating drum of ambient temperature without application of shear stresses with 7.5 grams of "Teflon ®" PTFE powder "KlON" for 10 minutes and then heated over night to 110° C. A sigma-blade mixer was heated by IR-lamps to 100° C. The premixed hot powder was charged into the sigmamixer and the mixing started immediately with shear stresses being applied to the mixture. After 2 minutes, a substantial amount of fibers formed and the powder was about to form a dough. 270 ml of boiling water was poured into the mixture with continuous mixing. The internal friction of the paste noticed by the forces the motor had to apply to the mixture, were decreased. The product formed was well suited to apply by pasting in conventional pasting machines into grids intended for lead storage batteries.

EXAMPLE 4

The procedure of Example 3 was followed except that 400 ml of boiling water was added and after cooling the mixture to 35° C. 170 ml of $H_2SO_4$ (density 1.40) was added dropwise during 20 minutes with continuous mixing. This product showed the same amount and length of fibers as in Example 3 and was well suited to apply into grids by pasting. The wet paste weight was 316 grams/5 in³ determined by measuring the volume of a weighed lump of the paste in a graduated glass with water.

The handling of the active material right on to its transference on electrode grids is simplified according to the method of the present invention, in comparison with the usual production and application of a lubricating mass.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed:

1. A method for the production of a plate-type electrode for a lead storage battery comprising forming a mixture of lead powder which normally is at least 70% oxidized and from 0.1 to 3 percent by weight of polytetrafluoroethylene, heating the mixture, applying shear stresses to said powder mixture sufficient to convert substantially all of the polytetrafluoroethylene into fibrous form and applying the heated mixture to an electrode grid under conditions whereby a unitary, coherent structure is formed.

2. The method of claim 1 wherein said mixture contains from 0.2 to 0.5 weight percent of polytetrafluoroethylene.

3. The method of claim 1 wherein the mixture is heated to a temperature of about 80° C.

4. The method of claim 1 wherein the heated mixture is further mixed with a liquid.

5. The method of claim 4 wherein the liquid is heated to a temperature of at least 60° C.

6. The method of claim 4 wherein the liquid is water or an electrolyte containing anions capable of forming insoluble or slightly soluble lead compounds.

7. An electrode for a lead storage battery produced by the process of claim 1.

8. An electrode for a lead storage battery produced by the process of claim 4.

* * * * *